United States Patent
Sandler et al.

(10) Patent No.: US 9,375,653 B2
(45) Date of Patent: Jun. 28, 2016

(54) CONCENTRATING AN INK COMPOSITION

(71) Applicant: Hewlett-Packard Indigo B.V., Amstelveen (NL)

(72) Inventors: Mark Sandler, Nes Ziona (IL); Shai Lior, Nes Ziona (IL); Avner Schneider, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 14/798,096

(22) Filed: Jul. 13, 2015

(65) Prior Publication Data
US 2015/0321117 A1  Nov. 12, 2015

Related U.S. Application Data

(62) Division of application No. 14/372,515, filed as application No. PCT/EP2013/050969 on Jan. 18, 2013.

(51) Int. Cl.
*B01D 1/00* (2006.01)
*B01D 1/22* (2006.01)
(Continued)

(52) U.S. Cl.
CPC .............. *B01D 1/0017* (2013.01); *B01D 1/228* (2013.01); *G03G 15/105* (2013.01); *G03G 15/11* (2013.01)

(58) Field of Classification Search
CPC ................................ G03G 15/10; G03G 15/11
See application file for complete search history.

(56) References Cited

U.S. PATENT DOCUMENTS

| | | |
|---|---|---|
| 3,642,605 A | 2/1972 | Chenel et al. |
| 3,863,603 A | 2/1975 | Buckley et al. |

(Continued)

FOREIGN PATENT DOCUMENTS

| | | |
|---|---|---|
| EP | 0380813 | 8/1990 |
| EP | 0458603 | 11/1991 |

(Continued)

OTHER PUBLICATIONS

Larostat 264A Quaternary Ammonium Compound, Technical Bulletin, BASF Corporation, 2002.

(Continued)

*Primary Examiner* — Clayton E LaBalle
*Assistant Examiner* — Victor Verbitsky
(74) *Attorney, Agent, or Firm* — Thorpe, North & Western L.L.P.

(57) ABSTRACT

Disclosed herein is a method for concentrating an ink composition, wherein the method comprises the steps of:
(a) providing an ink composition, the ink composition comprising a liquid carrier and particles comprising a resin and a colorant, and wherein the ink composition contains less than 0.3 mg of charge director per g of solids in the ink composition;
(b) passing the ink composition between a chargeable conveyor and a first electrode, wherein a potential is applied such that the ink composition becomes adhered to the chargeable conveyor, wherein the electric field between the chargeable conveyor and the first electrode is 2000 V/mm or more;
(c) passing the ink composition on the conveyor past a moving surface, wherein the ink contacts the moving surface and a potential is applied between the conveyor and the moving surface, such that the chargeable particles are disposed to move toward the conveyor and some of the liquid carrier is removed to increase the concentration of the chargeable particles in the liquid carrier on the conveyor to form a concentrated ink on the conveyor, the conveyor and the moving surface then diverging from one another, and at least some of the concentrated ink remains on the conveyor, and
(d) removing the concentrated ink from the conveyor and transferring it to a storage vessel. Also disclosed herein is an apparatus.

9 Claims, 2 Drawing Sheets

(51) Int. Cl.
*G03G 15/10* (2006.01)
*G03G 15/11* (2006.01)

(56) References Cited

U.S. PATENT DOCUMENTS

| | | | | |
|---|---|---|---|---|
| 3,937,571 | A | * | 2/1976 | Krulik .................. G03G 5/02 399/135 |
| 3,959,574 | A | | 5/1976 | Seanor et al. |
| 4,286,039 | A | * | 8/1981 | Landa .................. G03G 15/11 399/239 |
| 5,148,222 | A | * | 9/1992 | Lior .................... G03G 15/101 399/233 |
| 5,192,638 | A | | 3/1993 | Landa et al. |
| 5,244,766 | A | * | 9/1993 | Houle .................. G03G 9/12 430/114 |
| 5,436,706 | A | | 7/1995 | Landa et al. |
| 5,514,269 | A | | 5/1996 | Day et al. |
| 5,525,449 | A | * | 6/1996 | Spiewak ............ G03G 9/1355 430/112 |
| 5,610,694 | A | | 3/1997 | Lior et al. |
| 5,737,666 | A | | 4/1998 | Lior et al. |
| 5,815,779 | A | * | 9/1998 | Abramsohn ........ G03G 15/11 399/249 |
| 5,942,095 | A | | 8/1999 | Day et al. |
| 6,070,042 | A | | 5/2000 | Landa et al. |
| 6,072,972 | A | | 6/2000 | Obu et al. |
| 6,093,516 | A | | 7/2000 | Tavernier et al. |
| 6,183,931 | B1 | | 2/2001 | Odell |
| 6,212,347 | B1 | * | 4/2001 | Zhao .................. G03G 9/09783 399/237 |
| 6,219,501 | B1 | | 4/2001 | Zhao et al. |
| 6,337,168 | B1 | | 1/2002 | Almog |
| 6,621,998 | B2 | | 9/2003 | Liu et al. |
| 7,344,817 | B2 | | 3/2008 | Chou et al. |
| 7,544,488 | B2 | | 6/2009 | Ferrari et al. |
| 2010/0010437 | A1 | | 1/2010 | Miles et al. |
| 2011/0206397 | A1 | | 8/2011 | Higuchi et al. |
| 2012/0134725 | A1 | * | 5/2012 | Kawahara .......... G03G 21/0029 399/346 |
| 2014/0320576 | A1 | * | 10/2014 | Bar-Haim ............ G03G 9/131 347/112 |

FOREIGN PATENT DOCUMENTS

| | | | |
|---|---|---|---|
| JP | 04253061 A | * | 9/1992 |
| JP | H07301998 | | 11/1995 |
| JP | H11109680 | | 4/1999 |
| JP | 11254698 | | 9/1999 |
| JP | 2004295142 | | 10/2004 |
| JP | 2011175052 | | 9/2011 |
| WO | 2005005459 | | 1/2005 |
| WO | 2006131905 | | 12/2006 |
| WO | 2007130069 | | 11/2007 |
| WO | 2008054386 | | 5/2008 |
| WO | 2008085709 | | 7/2008 |
| WO | 2011001199 | | 1/2011 |

OTHER PUBLICATIONS

Lawrence B Schein—Electrophotography and Development Physics—1996—pp. 85-87 and p. 187.

* cited by examiner

CONCENTRATING AN INK COMPOSITION

This application is a divisional application of U.S. patent application Ser. No. 14/372,515, filed Jul. 16, 2014.

BACKGROUND

In general, electrostatic printing processes involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Figure 1:
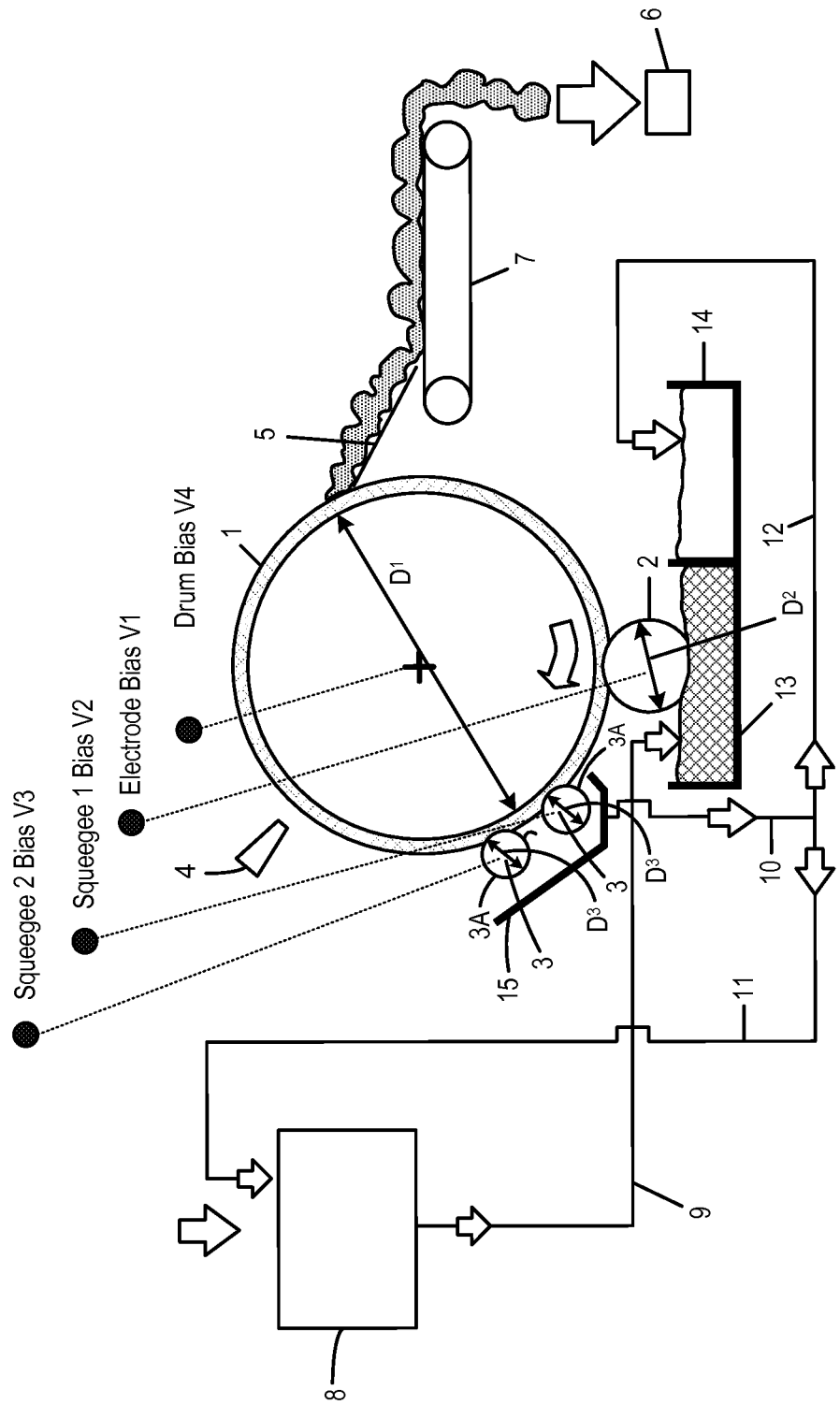
FIG. 1 shows an example of an apparatus for concentrating an ink composition, and for carrying out examples of the method described herein.

Before the present invention is disclosed and described, it is to be understood that this invention is not limited to the particular process steps and materials disclosed herein because such process steps and materials may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to a ink composition in liquid form that is typically suitable for use in an electrostatic printing process, sometimes termed an electrophotographic printing process.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involves subjecting the electrostatic ink composition to an electric field, e.g. an electric field having a field gradient of 1000 V/cm or more, e.g. an electric field having a field gradient of 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Further-more, such an interpretation should apply regardless of the breadth of the range or the characteristics being described.

Unless otherwise stated, any feature described herein can be combined with any aspect of the invention or any other feature described herein.

In an aspect, there is provided a method for concentrating an ink composition, wherein the method comprises the steps of:
 (a) providing an ink composition, the ink composition comprising a liquid carrier and particles comprising a resin and a colorant, and wherein the ink composition contains less than 0.3 mg of charge director per g of solids in the ink composition;
 (b) passing the ink composition between a chargeable conveyor and a first electrode, wherein a potential is applied such that the ink composition becomes adhered to the chargeable conveyor;
 (c) passing the ink composition on the conveyor past a moving surface, wherein the ink contacts the moving surface and a potential is applied between the conveyor and the moving surface, such that the particles are disposed to move toward the conveyor and some of the liquid carrier is removed to increase the concentration of the particles in the liquid carrier on the conveyor to form a concentrated ink on the conveyor, the conveyor and the moving surface then diverging from one another, and at least some of the concentrated ink remains on the conveyor, and
 (d) removing the concentrated ink from the conveyor and transferring it to a storage vessel.

In a further aspect, there is provided an apparatus for concentrating an ink composition, the apparatus comprising a rotatable drum comprising an aluminium core, which has a hard anodised surface covering, a first electrode disposed adjacent the surface covering, a roller having a metal core with an outer surface layer comprising an elastomeric material, wherein, in the absence of any ink composition, the elastomeric material of the roller and the hard anodised coating of the rotatable drum are in contact,
 wherein the apparatus is configured to apply a potential to the electrode and the roller of −2800 V or less, and the potential applied to the rotatable drum −500 V or more, and/or the apparatus is configured to apply a potential applied to the electrode and the roller of 2800 V or more, and the potential applied to the rotatable drum 500 V or less.

The present inventors have found that they can concentrate an ink composition containing a low amount or no charge director. This is surprising, since it was expected that a charge director should be present to impart charge on the resin-containing particles, to allow them to be manipulated in an electric field gradient. Additionally, it had previously been considered that concentrating liquid electrostatic inks to a solids content of 30-35 wt % or higher using some methods of the prior art irreversibly changes the particle structures in the ink, degrading the print quality and making the ink unsuitable for use on the electrostatic printing presses. However, the method described herein does not seem to adversely affect the quality of the ink. After the ink has been concentrated, a charge director can be added and/or the ink diluted, and the ink then used in an electrostatic printing process. In some instances in the prior art, the content of the liquid carrier in an electrostatic ink is typically 75 to 80 weight % when shipped to printers. The ink may be further diluted to about 98 weight % liquid content before it is used in a printing press. By concentrating the ink, this reduces the total weight of the ink composition that needs to be transported, hence producing savings in energy and costs. Additionally, the method of the present invention may be a continuous process, which is advantageous over a batch process. Additionally, it avoids the need for use of some possible concentrating equipment, e.g. centrifuges, which can have a very large footprint and be very costly to purchase.

Ink for an Electrostatic Printing Process

The ink in step (a) comprises a liquid carrier and particles comprising a resin and a colorant.

The resin may include a thermoplastic polymer. In particular, the polymer of the resin may be selected from ethylene acrylic acid copolymers; methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl may be from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the resin comprises a first polymer that is a copolymer of ethylene or propylene and an ethylenically unsaturated acid of either acrylic acid and methacrylic acid. In some examples, the first polymer is absent ester groups and the resin further comprises a second polymer having ester side groups that is a co-polymer of (i) a first monomer having ester side groups selected from esterified acrylic acid or esterified methacrylic acid, (ii) a second monomer having acidic side groups selected from acrylic or methacrylic acid and (iii) a third monomer selected from ethylene and propylene.

In step (a), the resin may constitute 5% to 99% by weight of the solids in the ink composition, in some examples 50% to 90% by weight of the solids of the ink composition, in some examples 70% to 90% by weight of the solids of the ink composition. The remaining wt % of the solids in the ink composition may be the colorant and, in some examples, any other additives that may be present.

Generally, the liquid carrier acts as a dispersing medium for the other components in the ink. For example, the liquid carrier can comprise or be a hydrocarbon, silicone oil, vegetable oil, etc. The liquid carrier can include, but is not limited to, an insulating, non-polar, non-aqueous liquid that is used as the medium for toner particles. The liquid carrier can include compounds that have a resistivity in excess of about $10^9$ ohm-cm. The liquid carrier may have a dielectric constant below about 30, in some examples below about 10, in some examples below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M®, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H®, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The liquid carriers and other components of the present disclosure are described in U.S. Pat. Nos. 6,337,168, 6,070,042, and U.S. Pat. No. 5,192,638, all of which are incorporated herein by reference.

In some examples, the liquid carrier, in step (a), constitutes about 20 to 99.5% by weight of the ink, in some example 50 to 99.5% by weight of the ink. In some examples, the liquid carrier, in step (a), constitutes about 40 to 90% by weight of the ink. In some examples, in step (a), the liquid carrier constitutes about 60 to 80% by weight of the ink composition. In some examples, in step (a), the liquid carrier may constitute about 90 to 99.5% of the electrostatic ink composition, in some examples 95 to 99% of the electrostatic ink composition. In some examples, the remaining wt % of the ink composition is formed from the particles comprising a resin and a colorant.

The colorant may be a dye or pigment. The particles may comprise a pigment. The colorant can be any colorant compatible with the liquid carrier and useful for electrostatic printing. For example, the colorant may be present as pigment particles, or may comprise a resin (in addition to the polymers described herein) and a pigment. The resins and pigments can be any of those commonly used as known in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The amounts of charge director described herein may relate to the total amount of charge director in the ink composition. In some examples, a plurality of types of charge director may be included in the ink composition and the amounts are the sum of the different types of charge director in the ink composition.

In some prior art techniques, a charge director is added to the carrier liquid to impart a charge on the ink particles. Below a level of 0.3 mg of charge director per g of solids of the ink composition, little, if any, charging effect is seen. In step (a) of the method, the ink composition may contain less than 0.2 mg of charge director per g of solids in the ink composition, in some examples less than 0.1 mg of charge director per g of solids in the ink composition, in some examples less than 0.05 mg of charge director per g of solids in the ink composition. In some examples, in step (a) of the first aspect, charge director is defined as a director selected from of zirconium salts of fatty acids, e.g. zirconium octoate, metal salts of sulfo-succinates, metal salts of oxyphosphates, metal salts of alkyl-benzenesulfonic acid, metal salts of aromatic carboxylic acids or sulfonic acids, polyoxyethylated alkylamines, lecithin, polyvinylpyrrolidone and organic acid esters of polyvalent alcohols. In some examples, in step (a) of the method, the ink composition is substantially free or free of charge director. In some examples, in step (a) of the method, the ink composition is substantially free or free of metal salts of zirconium salts of fatty acids, e.g. zirconium octoate, sulfo-succinates, metal salts of oxyphosphates, metal salts of alkyl-benzenesulfonic acid, metal salts of aromatic carboxylic acids or sulfonic acids, polyoxyethylated alkylamines, lecithin, polyvinylpyrrolidone and organic acid esters of polyvalent alcohols. In some examples, in step (a) of the method, the ink composition is substantially free or free of oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, in step (a) of the method, the ink composition is substantially free or free of sulfonic acids, including, but not limited to, alkyl sulfonic acids, aryl sulfonic acids, and sulfonic acids of alkyl succinates (e.g. see WO 2007/130069).

The electrostatic ink composition may comprise one or more additives, for example a charge adjuvant, a wax, a surfactant, biocides, organic solvents, viscosity modifiers, materials for pH adjustment, sequestering agents, preservatives, compatibility additives, emulsifiers and the like.

In some examples, the ink composition, in step (a) of the first aspect, comprises an aluminium salt, such as an aluminium salt of a fatty acid, including, but not limited to aluminium stearate. This acts to stabilise the charge on resin particles once charged after passing between the first electrode and movable conveyor. In some examples, aluminium salts, including aluminium stearate, are not charge directors, for example when used in combination with a resin having acidic side groups.

In some examples, in step (a), the ink has a high field conductivity of 50 pmho/cm or less, in some examples a high field conductivity of 30 pmho/cm or less, in some examples, a high field conductivity of 20 pmho/cm or less, in some examples, a high field conductivity of 10 pmho/cm or less.

The high field conductivity of the ink composition is measured at 1500 V/mm using a DC current at 23° C.

In some examples, in step (a), the ink has a low field conductivity of 10 pmho/cm or less, in some examples 5 pmho/cm or less, in some examples 2 pmho/cm or less, in some examples 0 pmho/cm. Low field conductivity is measured by applying a constant amplitude AC voltage to two parallel electrodes and monitoring the current via the fluid—in this instance, the electric field amplitude was 5 V/mm, frequency was 5 Hz, and the temperature was 23° C.

Chargeable Conveyor

The chargeable conveyor may be any suitable conveyor that can support and move the ink composition, and to which a potential can be applied. When charged, i.e. when a potential is applied between the chargeable conveyor and the electrode, the conveyor is adapted so that the particles adhere to the conveyor.

The conveyor will typically have a continuous surface that forms a loop. In some examples, the conveyor is in the form of rotatable drum, the outer surface of which acts to support the ink composition. The drum may rotate on an axis, which may be orientated at any desired angle. In some examples, the axis of the drum is on the horizontal. The drum may be any suitable shape, and in some examples is cylindrical, with the axis of rotation forming the axis of the cylinder.

In some examples, the chargeable conveyor is in the form of a belt that is driven by a suitable mechanism, such as one or more rollers.

The chargeable conveyor may comprise a metal. The metal may be selected from, but is not limited to, steel, aluminium and copper, and alloys including any of these metals. The chargeable conveyor may comprise a metal substrate, e.g. a drum, having a surface covering of a non-metallic material, which may be a non-metallic, elastomeric or non-elastomeric material. Non-metallic, non-elastic materials may be selected from metal oxides and carbon-containing coatings, such as a diamond-like carbon coating. The elastomeric material may comprise a material selected from chloroprene rubber, isoprene rubber, EPDM rubber, polyurethane rubber, epoxy rubber, butyl rubber, fluoroelastomers (such as the commercially available Viton) and polyurethane. The elastomeric material may further comprise a resistivity control agent, which may be dispersed in the elastomeric material, and the resistivity control agent may be selected from an ionic material, a metal or carbon. The ionic material may be a quaternary ammonium compound. The resistivity control agent, which may be dispersed in the elastomeric material, may be selected from organic dyes, organic pigments, organic salts, polyelectrolytes, inorganic salts, plasticisers, inorganic pigments, metallic particles, charge transfer complexes or materials which produce charge transfer complexes with the elastomeric material, e.g. polyurethane. The resistivity control agent may be present in an amount of 0.1 to 6 wt % of the surface covering, while the remaining wt percentage may be the elastomeric material. The resistivity control agent may be a quaternary ammonium compound, for example a compound of the formula $(NR1'R2'R3'R4)X'$, in which $R^{1'} R^{2'} R^{3'}$ and $R^4$ are each independently hydrocarbon groups, including, but not limited to, alkyl or aryl groups, and wherein the alkyl is substituted or unsubstituted, branched or straight-chain, saturated or unsaturated, and X' is an anion, such as a halide. Examples of quaternary ammonium compounds include, but are not limited to, tetraheptyl ammonium bromide, trimethyloctadecylammonium chloride, benzyltrimethylammonium chloride. In some examples, the resistivity control agent is a lithium salt.

The chargeable conveyor may comprise a metal substrate, e.g. a drum, having a surface covering of a metal oxide, and the metal of the metal substrate and that of the metal oxide may be the same. In some examples, The surface covering may have a thickness of at least 5 μm, in some examples at least 10 μm, in some examples, at least 15 μm, in some examples at least 25 μm. In some examples, the surface covering may have a thickness of from 5 μm to 100 μm, in some examples from 20 to 80 μm, in some examples from 30 to 70 μm, in some examples from 45 to 60 μm. In some examples, the chargeable conveyor comprises a metal substrate having an anodised surface coating of a metal oxide, in some examples having a thickness of at least 5 μm, in some examples at least 10 μm, in some examples at least 15 μm, in some examples at least 25 μm. In some examples, the chargeable conveyor comprises a metal substrate having an anodised surface coating of a metal oxide having a thickness of from 5 μm to 100 μm, in some examples from 20 to 80 μm, in some examples from 30 to 70 μm, in some examples from 45 to 60 μm. In some examples, the chargeable conveyor comprises an aluminium substrate having an anodised surface coating comprising an aluminium oxide. In some examples, the anodised surface coating is a Type III anodised coating, sometimes termed in the art as an anodised hardcoat, a coating formed by hard anodising or by engineering anodising. Methods for carrying out Type III or hard anodising are known in the art, and standards for such anodising can be found, for example, in MIL-A-8625 Type III, AMS 2469H, BS ISO 10074:2010 and BS EN 2536:1995, the specifications of which are all incorporated herein by reference in their entirety. The present inventors have found that hard anodizing a surface of the metal chargeable conveyor produces a conveyor with a favourable resistivity that is able to suitably control charge transfer from the conveyor to the particles of the electrostatic ink composition.

The chargeable conveyor may be of any suitable size. In some examples, the chargeable conveyor has a width, measured in a direction across its surface perpendicular to the direction of movement of its surface of at least 40 cm, in some examples at least 50 cm, in some examples at least 60 cm, in some examples at least 70 cm, in some examples at least 1 m, in some examples at least 2 m, in some examples at least 3 m, in some examples from 40 cm to 4 m, in some examples from 200 cm to 400 cm, in some examples from 250 cm to 350 cm. In some examples, the chargeable conveyor is or comprises a rotatable drum in the form of a cylinder that has a width, measured in a direction across its surface perpendicular to the direction of movement of its surface (i.e. parallel to the axis of the cylinder) of at least 40 cm, in some examples at least 50 cm, in some examples at least 60 cm, in some examples at least 70 cm, in some examples at least 1 m, in some examples at least 2 m, in some examples at least 3 m, in some examples from 40 cm to 4 m, in some examples from 200 cm to 400 cm, in some examples from 250 cm to 350 cm. In some examples, the chargeable conveyor is or comprises a rotatable drum in the form of a cylinder that has a diameter, of at least 40 cm, in some examples at least 50 cm, in some examples at least 60 cm, in some examples at least 70 cm, in some examples at least 1 m, in some examples at least 2 m, in some examples from 40 cm to 3 m, in some examples from 100 cm to 300 cm, in some examples from 250 cm, to 350 cm. In some examples, the ratio of width of the cylinder:diameter of cylinder is 2:1 to 1:2.

The chargeable conveyor may have a surface with a resistivity of about $1 \times 10^9$ to $1 \times 10^{11}$ Ohm*cm, or in some examples a resistivity of about $1 \times 10^{10}$ Ohm*cm.

First Electrode

The first electrode can be any suitable electrode capable of applying a potential between the chargeable conveyor and the first electrode. The electrode may be stationary relative to the chargeable conveyor. The first electrode may have a shape that, at least in part, corresponds to the shape of at least part of the chargeable conveyor. For example, if the chargeable conveyor is a cylinder having an axis, the electrode may have a cross section that forms part of a circle, the centre of this circle being the same as that for the cylinder. In some examples, if the chargeable conveyor is a cylinder having an axis, the electrode may have an inner surface that forms part of a cylinder shape, the axis of this cylinder shape being the same as that for the cylinder of the chargeable conveyor.

In some examples, the shortest distance between the first electrode and the chargeable conveyor is from 0.5 mm to 5 mm, in some examples from 0.5 to 2 mm, in some examples from 0.8 mm to 1.2 mm.

In some examples, the first electrode may be in the form of roller or a belt, having a surface that can move in the same direction as the surface of the chargeable conveyor, and may contact the surface of the chargeable conveyor. If the first electrode is in the form of a roller, e.g. a cylinder, and the movable conveyor is in the form of a drum, the roller of the first electrode may have a diameter that is less than the diameter of roller of drum of the movable conveyor. In some examples, a plurality of first electrodes in the form of rollers and/or belts, e.g. as described above, may be disposed around the chargeable conveyor, and, in use, each may be used to adhere the particles comprising the resin to the chargeable conveyor.

The electrode may comprise any electrically conducting material, including, but not limited to, a metal and carbon. The electrode may comprise a metal selected from copper, aluminum and steel.

In the method, a potential is applied such that the ink composition becomes adhered to the chargeable conveyor. The potential difference between the chargeable conveyor and the first electrode may be 500 V or more, in some examples 1000 V or more, in some examples 2000 V or more, in some examples 3000 V or more, in some examples 3200 V or more, in some examples 3500 V or more, in some examples 3800 V or more, in some examples 4000 V or more. The potential difference between the chargeable conveyor and the first electrode be from 500 V to 7000V, in some examples 1000 V to 7000 V, in some examples 3000 V to 6000 V, in some examples 3000V to 4000 V. The chargeable conveyor may be at a potential more positive than the first electrode or the chargeable conveyor may be at a potential less positive than the first electrode. In some examples, the potential of the chargeable conveyor may be at or close to, e.g. within 50 V of, ground (0 V). The present inventors have found that the relative polarity between the chargeable conveyor and the first electrode can be changed—this is an advantage over some techniques of the prior art where the particles would have a given polarity, dependent often on the charge director used, such that the particles would only move away from a first potential to a second potential when the first potential is at more positive polarity than the second potential, or vice versa. This allows for more versatility when using the method.

In the method, the surface of the conveyor may travel at a speed of from 1 to 100 cm/sec, or in some examples 5 to 70 cm/sec, or in some examples 10 to 50 cm/sec, or in some examples 20 to 50 cm/sec, or in some examples 30 to 50 cm/sec.

The electric field between the chargeable conveyor and first electrode may be 2000 V/mm or more, in some examples 2500 V/mm or more, in some examples, 2800 V/mm or more, in some examples 2900 V/mm or more, in some examples 3000 V/mm or more, in some examples, 3200 V/mm or more, in some examples 3500 V/mm or more, in some examples 3800 V/mm or more, in some examples 4000 V/mm or more. The electric field between the chargeable conveyor and the first electrode may be from 2000 V/mm to 6000 V/mm, in some examples from 2500 V/mm to 5000 V/mm, in some examples 2800 V/mm to 4700 V/mm, in some examples 2900 V/mm to 4600 V/mm, in some examples 2900 V/mm to 4500 V/mm, in some examples 2900 V/mm to 4200 V/mm. The present inventors have found that if the particles are passed through a high electric field, this promotes their charging, and fields of 3000 V/mm or more have been found to be particularly effective in promoting charging of the particles, even when they lack a charge director.

The first electrode may be positioned below the chargeable conveyor, with a separation between the first electrode and chargeable conveyor forming a gap. The method may be such that the ink for the electrostatic printing process fills, at least partially, the gap between the chargeable conveyor and the first electrode, and the potential in step (b) is applied such that the ink becomes adhered to the chargeable conveyor.

In some examples, the first electrode comprises a roller, which is positioned below the chargeable conveyor, and in a reservoir for the ink composition to be concentrated (in step (a)). In some examples, the first electrode comprises a plurality of rollers, which are positioned below the chargeable conveyor, and each of which is in a reservoir for the ink composition to be concentrated (in step (a)). In some examples, the chargeable conveyor is in the form of a drum having a surface covering of a non-metallic, non-elastomeric material and the first electrode is in the form of a roller comprising a metal core having a surface covering of a non-metallic elastomeric material.

Moving Surface

The method involves passing the ink on the conveyor past the moving surface, wherein the ink contacts the moving surface and a potential is applied between the conveyor and the moving surface, such that the particles are disposed to move toward the conveyor and some of the liquid carrier is removed to increase the concentration of the chargeable particles in the liquid carrier on the conveyor to form a concentrated ink on the conveyor.

The moving surface forms the outer surface of a moving body, which may be in the form of a drum or belt, as described herein. The moving surface may form part of a drum or a belt, driven by rollers. The moving surface and the body of which it forms part are able to be biased, such that a potential can be applied between the moving surface and the chargeable conveyor. The moving surface may be considered to be part of a second electrode.

In some examples, the moving surface forms the outer surface of a rotatable drum. The drum having the moving surface may rotate on an axis, which may be orientated at any desired angle. In some examples, the axis of the drum having the moving the surface is on the horizontal. The drum having the moving surface may be any suitable shape, but in some examples is cylindrical, with the axis of rotation forming the axis of the cylinder.

In some examples, the moving surface forms the outer surface of a belt that is driven by a suitable mechanism, such as one or more rollers.

The moving body having the moving surface may comprise a metal. In some examples, the moving body having the moving surface may comprise a metal having a surface covering comprising an elastomeric material. For example, the moving body having the moving surface may comprise a drum having a metal core with an outer surface layer comprising an elastomeric material. The metal may be selected from, but is not limited to, steel, aluminium and copper. The surface covering or outer surface layer may comprise an elastomeric material and a resistivity control agent, which may be dispersed in the elastomeric material. The resistivity control agent may act to increase or decrease the resistivity of the elastomeric material (compared to the same material absent said resistivity control agent). The elastomeric material may comprise a material selected from chloroprene rubber, isoprene rubber, EPDM rubber, polyurethane rubber, epoxy rubber, butyl rubber, fluoroelastomers (such as the commercially available Viton) and polyurethane.

The resistivity control agent, which may be dispersed in the elastomeric material, may be selected from an ionic material, a metal or carbon. The ionic material may be a quaternary ammonium compound. The resistivity control agent, which may be dispersed in the elastomeric material, may be selected from organic dyes, organic pigments, organic salts, polyelectrolytes, inorganic salts, plasticisers, inorganic pigments, metallic particles, charge transfer complexes or materials which produce charge transfer complexes with the elastomeric material, e.g. polyurethane. The resistivity control agent may be present in an amount of 0.1 to 6 wt % of the surface covering, while the remaining wt percentage may be the elastomeric material. The resistivity control agent may be a quaternary ammonium compound, for example a compound of the formula $(NR1'R2'R3'R4)X'$, in which $R^{1'} R^{2'} R^{3'}$ and $R^4$ are each independently hydrocarbon groups, including, but not limited to, alkyl or aryl groups, and wherein the alkyl is substituted or unsubstituted, branched or straight-chain, saturated or unsaturated, and X' is an anion, such as a halide. Examples of quaternary ammonium compounds include, but are not limited to, tetraheptyl ammonium bromide, trimethyloctadecylammonium chloride, benzyltrimethylammonium chloride. In some examples, the resistivity control agent is a lithium salt.

If the moving surface is a moving body comprising a drum having a metal core with an outer surface layer comprising an elastomeric material, the resistivity of the surface of the drum may be from $1 \times 10^5$ Ohm*m to $1 \times 10^8$ Ohm*m, in some examples $1 \times 10^6$ Ohm*m to $1 \times 10^7$ Ohm*m, when measured between the roller and a metal rod in contact, the total area of the contact along the roller of about 340 mm is about 1 cm.

In some examples the chargeable conveyor comprises a metal substrate, e.g. a drum, having a surface covering of a non-metallic, elastomeric material, and the moving body having the moving surface comprises a metal substrate, e.g. a drum, having a surface covering of a non-metallic, non-elastomeric material.

In some examples, the chargeable conveyor comprises a metal substrate, e.g. a drum, having a surface covering of a non-metallic, non-elastomeric material, and the moving body having the moving surface comprises a metal substrate, e.g. a drum, having a surface covering of a non-metallic material, which may be a non-metallic, elastomeric material.

In some examples, a plurality of moving surfaces are disposed around the chargeable conveyor. For example, the first conveyor may comprises a first drum, and a plurality of second drums having the moving surface are disposed around the first drum. For example, the first conveyor may comprise a first drum, and at least two, in some examples at least three, in some examples at least four second drums having the moving surface are disposed around the first drum. The surface covering may have a resistivity of from 107 to 1011 ohm cm. The surface covering on the moving surface may have a thickness of from 0.001 mm to 20 mm, in some examples 0.05 mm to 10 mm, in some examples from 1 mm to 10 mm, in some examples 1 mm to 3 mm, in some examples 3 mm to 8 mm. The moving body having the moving surface may be constructed as described in the U.S. Pat. No. 3,863,603 (see description of the magnetic brush roll) and U.S. Pat. No. 3,959,574 (see description of the biasable transfer member), both of which are incorporated herein by reference in their entirety.

In some examples, the surface of the chargeable conveyor and the moving surface travel at the same relative speed and in the same direction at the point where they are closest to one another. In the method, the surface of the conveyor and the moving surface may travel at a speed of from 1 to 100 cm/sec, in some examples 5 to 50 cm/sec, in some examples 20 to 50 cm/sec, in some examples 30 to 50 cm/sec in some examples 10 to 30 cm/sec.

In the method, a potential is applied between the conveyor and the moving surface, such that the chargeable particles are disposed to move toward the conveyor and some of the liquid carrier is removed to increase the concentration of the chargeable particles in the liquid carrier on the conveyor to form a concentrated ink on the conveyor. The potential applied between the conveyor and the moving surface may be less than that applied between the electrode and the chargeable conveyor. The potential applied between the conveyor and the moving surface may be in the range of from 300 to 4000 V, in some examples 300 to 2000V, in some examples 300 to 1500 V, in some examples 500 to 1200 V, in some examples from 600 to 1100 V, in some examples from 700 to 1000 V, in some examples from 800 to 900 V.

In some examples, the potential applied to the first electrode and/or the moving surface is −2500 V or less (more negative), with the potential applied to the chargeable conveyor being at a potential more positive than −500 V. In some examples, the potential applied to the first electrode and/or the moving body is −2800 V or less, with the potential applied to the chargeable conveyor being at a potential more positive than −500 V, in some examples being 0V or more.

In some examples, the potential applied to the first electrode and/or the moving surface is 2500 V or more (more positive), with the potential applied to the chargeable conveyor being at a potential less positive than 500 V. In some examples, the potential applied to the first electrode and/or the moving body is 2800 V or more, with the potential applied to the chargeable conveyor being at a potential less positive than 500 V, in some examples being 0V or less.

In some examples, the first electrode is a roller and the moving surface forms part of a moving body, which is a rotating drum, and the chargeable conveyor is in the form of a drum, and the potential applied to the first electrode and/or the moving surface is −2500 V or less (more negative), with the potential applied to the chargeable conveyor being at a potential more positive than −500 V. In some examples, the potential applied to the first electrode and/or the moving body is −2800 V or less, in some examples −3000 V or less, with the potential applied to the chargeable conveyor being at a potential more positive than −500 V, in some examples being 0 V or more. In some examples, the first electrode is a roller, the chargeable conveyor is in the form of a drum, and a plurality of moving bodies in the form of rotating drums are disposed around the drum of the movable conveyor, each having the moving surface, and the potential applied to the first electrode and/or the moving bodies is −2500 V or less, in some examples −3000 V or less, in some examples with the potential applied to the chargeable conveyor being at a potential more positive than −500 V.

In some examples, the first electrode is a roller and the moving surface forms part of a moving body, which is a rotating drum, and the chargeable conveyor is in the form of a drum, and the potential applied to the first electrode and/or the moving surface is 2500 V or more (more positive), with the potential applied to the chargeable conveyor being at a potential less positive than 500 V. In some examples, the potential applied to the first electrode and/or the moving body is 2800 V or more, in some examples 3000 V or more, with the potential applied to the chargeable conveyor being at a potential less positive than 500 V, in some examples being 0 V or less. In some examples, the first electrode is a roller, the chargeable conveyor is in the form of a drum, and a plurality of moving bodies in the form of rotating drums are disposed around the drum of the movable conveyor, each having the moving surface, and the potential applied to the first electrode and/or the moving bodies is 2500 V or more, in some examples 3000 V or more, in some examples with the potential applied to the chargeable conveyor being at a potential less positive than 500 V.

In some examples, after the concentrated ink has been formed on the chargeable conveyor, the conveyor and the moving surface then diverge from one another, such that substantially all of the concentrated ink remains on the conveyor. In some examples, "substantially all of the concentrated ink" indicates that at least 90 wt %, in some examples at least 95 wt %, in some examples at least 99 wt %, of the particles in the concentrated ink remain adhered to the chargeable conveyor. In some examples only a very small quantity, in some examples none, of the concentrated ink is transferred to the moving surface. In some examples, "a very small quantity", indicates that 10 wt % or less, in some examples 5 wt %, in some examples 1 wt % or less of the particles in the concentrated ink are transferred to the moving surface.

In some examples, neither the chargeable conveyor nor the moving surface is or is part of a photoimaging plate.

Stream of Gas

The method may further involve directing a stream of gas, e.g. air, at the electrostatic ink on the chargeable conveyor. In some examples, the method may further involve directing a plurality of streams of gas, e.g. air, at the electrostatic ink on the chargeable conveyor. A stream of gas may be directed at the electrostatic ink on the chargeable conveyor before, during and/or after it has contacted the moving surface. Accordingly, the stream of gas may be directed at the electrostatic ink on the chargeable conveyor before or after it has been concentrated or during the concentration step involving the moving surface. In some examples, a stream of gas is directed at the electrostatic ink on the chargeable conveyor 0 to 30° from an angle that is perpendicular to the surface of the chargeable conveyor on which the electrostatic ink is disposed. In some examples, a stream of gas is directed at the electrostatic ink on the chargeable conveyor 0 to 20°, in some examples 0 to 10°, 0 to 5°, in some examples about 0° from an angle that is perpendicular to the surface of the chargeable conveyor on which the electrostatic ink is disposed. For example, if the chargeable conveyor comprises a drum in the form of a cylinder, during the method, the stream of gas may be directed toward the cylinder at an angle 0 to 30° from the radius of the cylinder.

In some examples, the stream or streams of gas may be produced by an air knife or a plurality of air knives. Air knives are known to the skilled person.

The stream of gas, e.g. air, may have a moving gas speed of at least 50 m/s, in some examples at least 80 m/s, in some examples at least 100 m/s. The stream of gas, e.g. air, may have a moving gas speed of from 50 to 200 m/s, in some examples 80 to 150 m/s, in some examples from 100 to 120 m/s.

In some examples, the stream of gas has a temperature of less than 60° C., in some examples less than 50° C., in some examples less than 40° C., in some examples less than 30° C. In some examples, the stream of gas has a temperature of from 10° C. to 60° C., in some examples a temperature of from 15° C. to 50° C., in some examples a temperature of from 20° C. to 40° C., in some examples a temperature of from 20° C. to 30° C.

The stream of gas has been found to further concentrate the ink, without significantly affecting the integrity of the resin particles.

Removing the Concentrated Ink

The method involves removing the concentrated ink from the conveyor and transferring it to a storage vessel. The removal may be by scraping the ink from the surface of the chargeable conveyor. The scraping may be effected by placing a stationary member, e.g. a plate or blade, in close proximity to, in some examples in contact with, the surface of the chargeable conveyor. The plate or blade may extend across the whole width of the chargeable conveyor, said width typically being perpendicular to the direction of travel of the surface of the chargeable conveyor. The stationary member may comprise any suitable material, including, but not limited to a metal or plastic.

The storage vessel may be any suitable container for an ink for an electrostatic printing process. In some examples, the ink is transferred to a storage container, which is then sealed. The sealed storage container containing the ink for the electrostatic printing process can then be transported as desired, for example to another site, where printing may take place.

In some examples, the method may further involve, after producing the concentrated ink and transferring it to a storage vessel, in some examples transporting the ink to another site, then diluting it with a carrier medium to reduce the solids content in weight percent (for example from a solids content of 30 wt % or more, in some examples 40 wt % or more, to a solids content of 10 wt % or less, in some examples 5 wt % or less), and then using the ink in an electrostatic printing process.

The concentrated ink, at the end of step (c) of the process may comprise 30% by weight or more solids, in some examples 35% by weight or more solids, in some examples 40% by weight or more solids.

The electrostatic printing process may involve
providing the concentrated ink, adding a charge director and, if desired, diluting it with a carrier medium to reduce the solids content in weight percent (for example from a solids content of 30 wt % or more, in some examples 40 wt % or more, to a solids content of 10 wt % or less, in some examples 5 wt % or less):
forming a latent electrostatic image on a surface;
contacting the surface with the ink, such that at least some of the particles adhere to the surface to form a developed toner image on the surface, and transferring the toner image to a print substrate.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition of the first aspect between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 1000 V/cm or more, in some examples 1500 V/cm or more.

The intermediate transfer member may be a rotating flexible member, which is in some examples heated, e.g. to a temperature of from 80 to 160° C. The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may in some examples be biaxially orientated polypropylene. The material may comprise a metal, which may be in sheet form. The metal may be selected from or made from, for instance, aluminum (Al), silver (Ag), tin (Sn), copper (Cu), mixtures thereof. In some examples, the print substrate comprises a cellulosic paper. In some examples, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The print substrate is in some examples a cellulosic print substrate such as paper. The cellulosic print substrate is in some examples a coated cellulosic print substrate, e.g. having a coating of a polymeric material thereon.

An example of the apparatus and method will now be described.

FIG. 1 shows schematically an apparatus for concentrating an ink for an electrostatic printing process. The apparatus comprises a chargeable conveyor in the form of a first drum 1, an electrode 2 in the form of a roller located below the drum 1, two second drums 3 having a surface 3A, an air knife 4, a scraper 5, and a storage vessel 6. FIG. 1 also shows a conveyor belt 7, a preparation tank 8, conduits 9, 10, 11 and 12, and receptacles 13 and 14.

The first drum 1 has a diameter $D^1$, and the second drums 3 each have a diameter $D^3$. The diameter $D^3$ is approximately the same as or smaller than diameter $D^1$.

As can be seen, the electrode 2 is in the form of a roller having a diameter $D^2$, which is the same as or smaller than diameter $D^1$ of the first drum. The first drum may be as described herein. In some examples, it has a core of metal, e.g. aluminium, and a surface coating of an anodized metal.

The surface of each of the second drums, in the absence of the ink for the electrostatic printing process, is in contact with the surface of the first drum. Each of the second drums has a core of a metal and a coating of an elastomeric material, e.g. polyurethane, in which is in some examples dispersed a resistivity control agent, such as a quaternary amine.

The surface of the roller of the first electrode, in the absence of the ink for the electrostatic printing process, may be in contact with the surface of the first drum or may be separated by a gap. The roller has a core of a metal and a coating of an elastomeric material, e.g. polyurethane, in which is in some examples dispersed a resistivity control agent, such as a quaternary amine.

An air knife 4 is located clockwise around from the second drums 3. The air knife is orientated such that a stream of air is directed toward the surface of the drum 1 along the radius of the cylinder of the drum. In some examples a plurality of air knives may be located around the chargeable conveyor.

A scraper 5 in the form of a metal blade is biased against the first drum 1 by a biasing means, e.g. springs (not shown). A conveyor belt 7 is located below the scraper. A storage vessel 6 is located below one end of the conveyor belt 7.

In use, an ink for use in an electrostatic printing process is first prepared in preparation tank 8. On entering the preparation tank, the precursor ink composition typically has an amount of non-volatile solids of 20-25 wt %. Once the precursor ink composition has been subjected to final stages of preparation, involving addition of certain additives and further dilution of the ink composition to an amount of non-volatile solids of 5 to 10% by weight, to form an ink composition for concentration, it is then fed to receptacle 13 via conduit 9, which may be a pipe or other similar hollow member. A pump (not shown) can be used to assist transfer of the ink composition from preparation tank 8 to receptacle 13. The ink composition in receptacle 13 is in contact with the roller 2, which is partially submerged below the surface of the ink composition. A potential V1 is applied to the electrode 2, a potential V2 is applied to the drum 3 located closest to roller 2 in a clockwise direction, a potential V3 is applied to the drum 3 located further from the roller 2 in a clockwise direction, and potential V4 is applied to the drum 1. The roller 2 and drums 3 all rotate in an anticlockwise direction, while the drum 1 rotates in a clockwise direction. As roller 2 rotates, some of the ink composition adheres to its surface. When the ink composition on the roller 2 contacts the drum, the potentials V1 and V4 are such that the particles in the ink composition move toward and adhere to the surface of the drum 1, together with some of the carrier liquid in which they are dispersed, to form a layer of ink on the surface of the first drum 1. The first drum rotates clockwise, such that the ink moves toward a second drum 3. The second drum 3 rotates so the surface of the second drum 3 moves at the same speed as the surface of the first drum 1 at their point of contact. A potential V2 is applied to the first drum 1 and the second drum 3, such that the particles are drawn toward the first drum 1 and away from the second drum 3. The second drum 3 contacts the ink on the surface of the first drum and acts to remove some of the liquid carrier from the ink, while much, if not all, of solids remains adhered to the surface of the first drum, together with the remaining liquid carrier. This produces a concentrated ink on the surface of the first drum. The excess liquid carrier separated from the composition on the drum 1 during contact with drums 3 falls into a collector 15. This excess liquid carrier is then transferred either back to the preparation tank 8 or to a receptacle 14, where it is ready for re-use if required.

The ink then moves toward and passes a further second drum 3. A potential V3 is applied between this further second drum 3 and the first drum 1, again such that the particles are drawn toward the surface of the first drum and away from the further second drum 3. More of the liquid carrier in the ink is removed, further concentrating the ink on the surface of the first drum.

The concentrated ink then passes the stream of air produced by the air knife 4, which serves to evaporate more of the liquid carrier, again further concentrating the ink on the surface of the first drum 1. On further rotation of the drum 1, the concentrated ink then reaches the blade 5, which is urged against the surface of the first drum 1 by means such as springs.

The blade acts to scrape off the concentrated ink from the surface of the first drum 1. The blade is orientated so that the concentrated ink then slides downward toward a conveyor belt 7, which is turning clockwise, to transport the ink to a storage vessel 6 located below its right hand end. The storage vessel 6 may, for example, be a cartridge for transporting the ink composition. It can be transported to another site, e.g. a site having apparatus for electrostatic printing, and then used for this electrostatic printing. It can be diluted if required by adding a liquid carrier, and then used in the electrostatic printing process.

Figure 2:
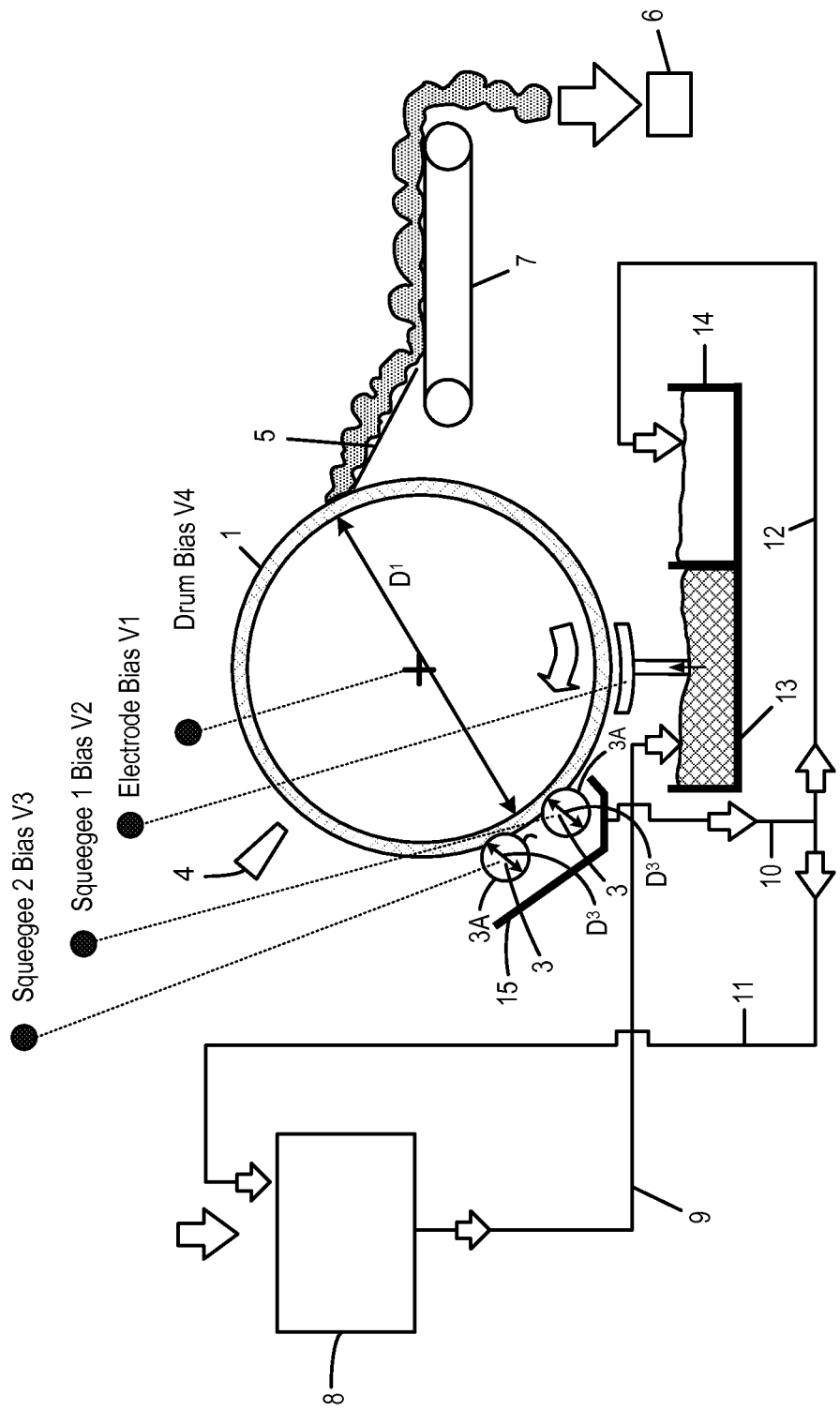
FIG. 2 shows another example of an apparatus for concentrating an ink composition, and for carrying out examples of the method described herein.

In a further example apparatus shown in FIG. 2, the first electrode is in the form of a stationary electrode 2 located below the drum 1. The stationary electrode has a curved surface that follows the surface of the drum, and a gap is present between the curved surfaces of the electrode 2 and the drum 1. In use, the ink composition to be concentrated is transferred to the gap between the stationary electrode 2 and the drum 1, and a potential is applied as described above with reference to FIG. 1, such that particles become charged and are disposed to move toward and adhere to the drum 1. The ink composition to be concentrated may be transferred from the reservoir 13 to the gap between the stationary electrode 2 and the drum 1 through a suitable conduit, e.g. a pipe, using a pump if required (not shown).

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present methods and apparatus have been described above with particularity, the following examples provide further detail in connection with what are presently deemed to be acceptable.

Apparatus

The present inventors carried out an example of the present method on an apparatus, much like the one shown in FIG. 1 and described above, although without the air knife. Further details on the material and construction of the apparatus are described below. They used, as a first drum 1, an aluminum drum coated with hard anodize to create an optimum resistivity. The thickness of the hard anodise coating on the drum was about 60 microns.

The dimensions of the first drum 1 were as follows:
Diameter—220 mm
Width—310 mm The electrode 2 was in the form of a roller having a diameter of 42 mm and a width of 310 mm. The roller had a metal core and an outer layer with a 3 mm thick polyurethane coating, the polyurethane having been impregnated with an ammonium salt (Larostat, available from BASF). The roller 2 was separated from the first drum 1 by a distance of 1 mm along all of its working width.

Two conductive rubber squeegee rollers, acting as the second drums 3, are in contact with the first drum 1 along all of their working widths applying mechanical pressure and electrical bias. Each of the conductive rubber squeegee rollers had a metal core with 3 mm thick polyurethane coating, the polyurethane having been impregnated with an ammonium salt (Larostat, available from BASF). The second drums 3 both had a diameter 28 mm and a width of 70 mm.

Conveyor belt 7, a preparation tank 8, conduits 9, 10, 11 and 12, receptacles 13 and 14, and collector 15 were part of the apparatus, arranged as described in relation to FIG. 1.

A metal blade 5 acts as a scraper and is pressed with springs to the drum after the squeegee roller to collect the concentrated material. In this example, there were no air knives.

The process speed, i.e. the speed of the surface of the first drum, was 400 mm/s during the tests.

A potential $V1$ is applied to the electrode 2, a potential $V2$ is applied to the drum 3 located closest to roller 2 in a clockwise direction, a potential $V3$ is applied to the drum 3 located further from the roller 2 in a clockwise direction, and potential $V4$ is applied to the drum 1. $V1$, $V2$, $V3$ and $V4$ were varied during the tests to determine the effect of certain combinations of potentials. The potentials are as shown in Table 1.

The concentration of ink, in terms of total solids content in wt %, both before and after concentration, was measured using standard moisture analyzer Sartorius MA150. The amounts for the concentration of the ink composition in receptacle 13 before concentration (the 'input' concentration) and after concentration after collection from the conveyor belt 7 are shown in Table 1 below.

The productivity of the device was measured by weight of the amount of toner collected during predefined time from predefined width.

Production of Ink Composition to be Concentrated

This Example describes the production of an ink composition/formulation lacking a charge director. This ink formulation uses a formulation with the resins Nucrel 925, Nucrel 2806 and Bynel 2022 in weight proportions 72:18:10 respectively, and is prepared with Isopar L to make paste that then added with pigment, VCA(di/tri Al stearate salt) and HPB. This ink is then diluted to working dispersion solid concentration by adding a heavy oil, such as Isopar and/or Marcol.

The general procedure for producing the ink formulation is described below.

As a first step, the resins Nucrel 925, Nucrel 2806 and Bynel 2022 in weight proportions 72:18:10 respectively were mixed in a Ross double planetary mixer with 1500 grams of Isopar L (an iso-parfinic oil manufactured by EXXON) carrier liquid at a speed of 60 rpm and a temperature of 130° C. for one hour. The total amount of resins in each case was 1000 g. The temperature is then reduced and mixing is continued until the mixture reaches room temperature. During mixing the polymer solvates the Isopar and during the cooling granules of polymer (with solvated carrier liquid) in carrier liquid are produced.

As a second step, 1000 grams of the mixture produced in the first step is charged into a Union Process 1S ball atritor together with 5 grams of aluminum tri-stearate (Riedel de-Haan) as a charge adjuvant and an appropriate amount of pigment. To make a cyan composition, the pigments TB5 and BSG87 were added so that they formed 12.1 and 0.9 wt %, respectively, of the solids of the composition; TB5 indicates a main Cyan pigment, a phthalocyanine pigment blue 15:3 provided by TOYO company. BSG87 indicates a secondary Cyan pigment, a phthalocyanine pigment green 7 provided by BASF company.

For a black ink composition, TB5 and BSG87 were replaced with 15.8 and 3.2 wt % (of the solids in the composition) of the pigment Monarch 800 and Alkali Blue D6200, respectively (available from Cabot AND Flint Group, respectively). For a yellow ink composition, TB5 and BSG87 were replaced with 11.2 and 2.8 wt % (of the solids in the composition) of the pigment Paliotol Yellow D1155 and Paliotol Yellow D1819, respectively (both available from BASF). For a magenta ink composition, TB5 and BSG87 were replaced with 18 and 2.5 wt % (of the solids in the composition) of the pigment Permanent Carmine FBB02 and Quindo Magenta 122, respectively (available from Clariant and Sun Chemical, respectively).

The toner concentrate made above containing resin particles of Nucrel 925, Nucrel 2806 and Bynel 2022 is transferred to the preparation tank and then diluted with additional Isopar L to produce a toner having approximately 5% NVS, with 98% of the carrier liquid being Isopar L.

Wax particles suspended in Isopar-L in a weight percentage of 4.5% with respect to the NVS of the toner particles were added. The wax was a polyethylene wax, Acumist B6, available from Honeywell.

The ink composition produced above lacks a charge director. For those tests in which a charge director was added, this was a synthetic charge director, namely a barium bis sulfosuccinate salt, as described in WO2007130069, including a sulfosuccinate moiety of the general formula [$R_1$—O—C(O)CH$_2$CH(SO$_3^-$)C(O)—O—$R_2$.], wherein each of $R_1$ and $R_2$ independently is a $C_{6-25}$ alkyl. When a weight of this SCD is referred to in the Tables below, it refers to the weight of a barium bis sulfosuccinate salt per gram of solids in the ink composition. Where a charge director was added, it was added to the ink composition in the preparation tank.

The results of the tests, and the potentials of the various components of the apparatus, are given in Table 1 below.

TABLE 1

| Colour | No. of test/ CD? | Avg of NVS output | % NVS input | HF (pmho/cm) | V1 (V) | V2 (V) | V3 (V) | Speed mm/s | LF (pmho/cm) |
|---|---|---|---|---|---|---|---|---|---|
| Cyan | 1/No CD | 35.3% | 5% | 9 | −3000 | −3000 | −3000 | 400 | LF-0 |
|  | 2/No CD |  |  |  |  |  |  |  |  |
|  | 3/No CD | 37.7% | 5% | 9 | −3000 | −3000 | −4500 | 400 | LF-0 |
|  | 4/No CD |  |  |  |  |  |  |  |  |
|  | 5/No CD | 34.3% | 5% | 9 | −4000 | −3000 | −4500 | 400 | LF-0 |
|  | 6/No CD |  |  |  |  |  |  |  |  |
|  | 1/CD | 39.9% | 5% | 227 | −3000 | −3000 | −3000 | 400 | LF-25 |
|  | 2/CD |  |  |  |  |  |  |  |  |
|  | 3/CD | 37.5% | 5% | 227 | −3000 | −3000 | −4500 | 400 | LF-25 |
|  | 4/CD |  |  |  |  |  |  |  |  |
|  | 5/CD | 40.3% | 5% | 227 | −4000 | −3000 | −4500 | 400 | LF-25 |
|  | 6/CD |  |  |  |  |  |  |  |  |
| Magenta | 1/No CD | 40.5% | 5% | 7 | −3000 | −3000 | −3000 | 400 | LF-0 |
|  | 2/No CD |  |  |  |  |  |  |  |  |
|  | 3/No CD | 42.0% | 5% | 7 | −3000 | −3000 | −4500 | 400 | LF-0 |
|  | 4/No CD |  |  |  |  |  |  |  |  |
|  | 5/No CD | 39.2% | 5% | 7 | −4000 | −3000 | −4500 | 400 | LF-0 |
|  | 6/No CD |  |  |  |  |  |  |  |  |
|  | 1/CD | 39.0% | 5% | 15 | −3000 | −3000 | −3000 | 400 | LF-3 |
|  | 2/CD |  |  |  |  |  |  |  |  |
|  | 3/CD | 38.6% | 5% | 15 | −3000 | −3000 | −4500 | 400 | LF-3 |
|  | 4/CD |  |  |  |  |  |  |  |  |
|  | 5/CD | 39.3% | 5% | 15 | −4000 | −3000 | −4500 | 400 | LF-3 |
|  | 6/CD |  |  |  |  |  |  |  |  |
| Yellow | 1/No CD | 37.8% | 5% | 9 | −3000 | −3000 | −3000 | 400 | LF-0 |
|  | 2/No CD |  |  |  |  |  |  |  |  |
|  | 3/No CD | 40.4% | 5% | 9 | −3000 | −3000 | −4500 | 400 | LF-0 |
|  | 4/No CD |  |  |  |  |  |  |  |  |
|  | 5/No CD | 38.9% | 5% | 9 | −4000 | −3000 | −4500 | 400 | LF-0 |
|  | 6/No CD |  |  |  |  |  |  |  |  |
|  | 1/CD | 39.6% | 5% | 209 | −3000 | −3000 | −3000 | 400 | LF-16 |
|  | 2/CD |  |  |  |  |  |  |  |  |
|  | 3/CD | 40.2% | 5% | 209 | −3000 | −3000 | −4500 | 400 | LF-16 |
|  | 4/CD |  |  |  |  |  |  |  |  |
|  | 5/CD | 40.4% | 5% | 209 | −4000 | −3000 | −4500 | 400 | LF-16 |
|  | 6/CD |  |  |  |  |  |  |  |  |
| Black | 1/No CD | 36.4% | 5% | 6 | −3000 | −3000 | −3000 | 400 | LF-0 |
|  | 2/No CD |  |  |  |  |  |  |  |  |
|  | 3/No CD | 37.4% | 5% | 6 | −3000 | −3000 | −4500 | 400 | LF-0 |
|  | 4/No CD |  |  |  |  |  |  |  |  |
|  | 5/No CD | 37.9% | 5% | 6 | −4000 | −3000 | −4500 | 400 | LF-0 |
|  | 6/No CD |  |  |  |  |  |  |  |  |
|  | 1/CD | 35.2% | 5% | 119 | −3000 | −3000 | −3000 | 400 | LF-17 |
|  | 2/CD |  |  |  |  |  |  |  |  |
|  | 3/CD | 36.2% | 5% | 119 | −3000 | −3000 | −4500 | 400 | LF-17 |
|  | 4/CD |  |  |  |  |  |  |  |  |
|  | 5/CD | 36.0% | 5% | 119 | −4000 | −3000 | −4500 | 400 | LF-17 |
|  | 6/CD |  |  |  |  |  |  |  |  |

'No CD' indicates that no charge director was present in the composition, whereas simply 'CD' indicates that the synthetic charge director mentioned above was present in an amount of 3.5-10 mg per gram of solids in the ink composition (depending on the color of the ink and the test) just before it was concentrated. HF indicates the high field conductivity of the ink composition just before concentration; high field conductivity is measured at 1500 V/mm using a DC current at 23° C. LF indicates the low field conductivity of the ink composition just before concentration; low field conductivity was measured by applying a constant amplitude AC voltage to two parallel electrodes and monitoring the current via the fluid - in this instance, the electric field amplitude was 5 V/mm, frequency was 5 Hz, and the temperature was 23° C. The potential of the drum 1 was set at ground (0 V).

As can be seen, the final concentrations of the ink compositions lacking a charge director are comparable to the final concentrations of the ink compositions containing a charge director. This is unexpected, in view of the expectation that a charge director would be required to impart sufficient charge on the resin particles to allow them to be manipulated in an electric field. It therefore allows production of concentrated ink compositions lacking an ink composition. The concentrated inks lacking a charge director may be stored and packaged as required. For electrostatic printing, the concentrated inks may be used in their concentrated form, or, if desired, diluted and, if desired, a charge director added.

While the invention has been described with reference to certain examples, those skilled in the art will appreciate that various modifications, changes, omissions, and substitutions can be made without departing from the spirit of the disclosure. It is intended, therefore, that the invention be limited only by the scope of the following claims. Unless otherwise stated, the features of any dependent claim can be combined with the features of any of the other dependent claims.

The invention claimed is:

1. An apparatus for concentrating an ink composition, the apparatus comprising a rotatable drum comprising an aluminum core, which has a hard anodized surface covering, an electrode disposed adjacent the hard anodized surface covering, and a roller having a metal core with an outer surface layer comprising an elastomeric material, wherein, in the absence of any ink composition, the elastomeric material of the roller and the hard anodized surface covering of the rotatable drum are in contact, wherein the apparatus is configured to apply a potential to each of the electrode and the roller of −2800 V or less, and apply a potential to the rotatable drum −500 V or more, or to apply a potential to each of the electrode and the roller of 2800 V or more, and apply a potential to the rotatable drum 500 V or less, and to apply an electric field between the rotatable drum and the first electrode of 2000 V/mm or more.

2. The apparatus according to claim 1, wherein the electrode is in the form of a second roller having a metal core with an outer surface layer comprising an elastomeric material.

3. The apparatus according to claim 1, wherein the hard anodized surface covering is a Type III anodized surface covering.

4. The apparatus according to claim 1, further comprising a receptacle for containing the ink composition and transferring the ink composition to the roller.

5. The apparatus according to claim 4, further comprising the ink composition contained within the receptacle.

6. The apparatus according to claim 5, wherein the ink composition comprises less than 0.3 mg of charge director per g of solids in the ink composition, or the ink composition is free of charge director.

7. The apparatus according to claim 5, wherein the ink composition comprises a resin including a first polymer that is a copolymer of ethylene or propylene and an ethylenically unsaturated acid of either acrylic acid or methacrylic acid.

8. The apparatus according to claim 7, wherein the first polymer does not include ester groups and the resin further comprises a second polymer having ester side groups, wherein the second polymer is a co-polymer of (i) a first monomer having ester side groups that is esterified acrylic acid or esterified methacrylic acid, (ii) a second monomer having acidic side groups that is acrylic acid or methacrylic acid, and (iii) a third monomer that is ethylene or propylene.

9. The apparatus according to claim 4, further comprising a preparation tank for preparing and transferring the ink composition to the receptacle.

* * * * *